Feb. 26, 1929.
F. I. NEVILL
1,703,354
WORKING VALVE AND PLUNGER FOR DEEP WELL PUMPS
Filed March 11, 1926
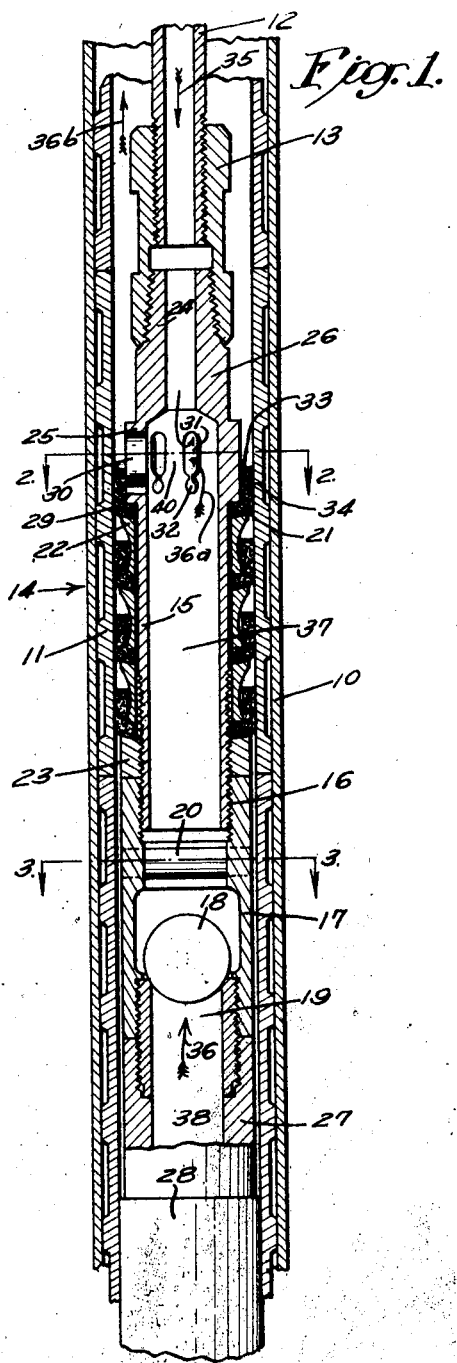
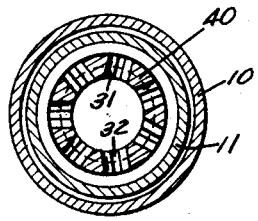
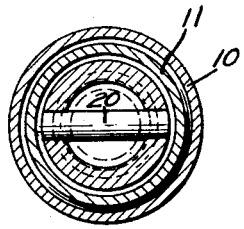
INVENTOR
FRANK I. NEVILL
By
ATTORNEY Patented Feb. 26, 1929.

1,703,354

UNITED STATES PATENT OFFICE.

FRANK I. NEVILL, OF HOUSTON, TEXAS.

WORKING VALVE AND PLUNGER FOR DEEP-WELL PUMPS.

Application filed March 11, 1926. Serial No. 93,823.

It is an object of this invention to provide a superior working valve organization, suitable for use in deep well pumps,—said organization comprising novel means for preventing or minimizing lodgement, upon the parts thereof, of any sand, or similar sediment contained in the pumped oil or other liquid, upon or between relatively moving parts.

In many of the pumps in current use, a plunger, which may be a comparatively long metallic cylinder closely interfitting within a suitable cylinder, is provided with a valve secured in a cage at the top thereof, this cage being directly connected with a string of sucker rods; and, even when wiping or suction cups are interposed between such a valve cage and the plunger therebelow, with a view to excluding sand, or the like, from contact with said cylindrical plunger, this arrangement commonly leaves a considerable settling space, at or below the base of the valve cage, into which space sand, or the like, tends to collect, above the plunger and/or the cups associated therewith, in such manner as to produce rapid wear, "gutting" one or both of the interfitting parts in a comparatively short time,—with consequent expensive delays and high replacement costs; and it is accordingly an object of my invention to provide a liquid-lifting or plunger organization with a valve, a cup or cups, fluid passages, and/or attaching means (optionally associated with wrench and/or fishing means) so constructed as substantially to prevent any lodgement of sand, or the like, above said cups,—the latter, when provided, being used either for a lifting effect or for a wiping effect, and disposed above a working valve in a blind cage.

For use in the general manner indicated, it is an object of this invention to provide a working or sand-valve organization comprising a one-piece connecting unit including (1) a tubular body or cup-carrier which is provided at its lower end with external threads engageable by a cup-retaining nut and/or a plunger or a blind valve cage,—this body being provided at its opposite end with (2) a solid or hollow threaded pin or a box (or another preferred mechanical connection) for securing a so-called sucker rod (solid or hollow) thereto; and, in preferred embodiments of my invention, intermediate and specially designed portions of said unit may serve respectively as (3) a slotted cage or head, providing oval or other lateral passages for the exit of the pumped liquid and (4) a wrenching and fishing shank, optionally interposed between the mentioned pin, or its equivalent, and said cage or slotted head,— the position and form of the openings in said cage or head being such, with relation to a surrounding cup, that the flow of oil through said openings substantially prevents lodgement of sand, or the like, upon or above said cup.

Other objects of my invention, including the optional provision of means whereby suitable fluid may be downwardly delivered to said head in such manner as to cause a substantially continuous upward movement of the pumped liquid through a delivery string, and including also a preferred proportioning of parts, such as to avoid any restriction of flow through said cage and such as nevertheless to assure a requisite strength in all parts of the mentioned one-piece unit (this unit being capable of use either with or without cups and either with or without a close-fitting cylindrical metallic plunger, as currently employed) may be best appreciated from the following description of an illustrative embodiment of my invention, taken in connection with the appended claims and the accompanying drawings, in which Fig. 1 is, for the most part, a substantially central vertical section through the upper part of a deep well pump equipped with a working valve organization illustrating my invention.

Fig. 2 is a horizontal section, taken substantially as indicated by the line 2—2 of Fig. 1.

Fig. 3 is a horizontal section taken substantially as indicated by the line 3—3 of Fig. 1.

Referring to the details of that specific embodiment of my invention chosen for purposes of illustration, 10 may be referred to as a pump cylinder (shown as provided with replaceable liners 11) a sucker rod 12 (shown as hollow, and extending upwardly to the surface of the ground) being secured (as by a coupling element 13) to a connecting unit 14, of special design.

The connecting unit 14 is shown as comprising a tubular portion or body 15, externally threaded at its lower end 16, as for the attachment of a (plunger or a) blind cage 17,—within which I show a ball valve 18, retained between an externally threaded seat 19 and a transverse pin 20,—the external cylindrical surface of the tubular body 15 being adapted to carry one or more annular cups 21. These cups, when two or more are employed, may be spaced apart by means such as longitudinally slidable and upwardly flared collars 22, and/or a nut or nuts 23, adapted to engage the same external thread by which the blind cage 17, or its equivalent, is removably attached. The connecting unit 14 may be provided, at or near its upper end, with a "box" or with a solid or hollow "pin" 24, or with any preferred mechanical connection engageable with an interfitting portion of the coupling element 13; and the intermediate portion 25 of said connecting unit may be so enlarged as to provide a slotted or laterally ported cage or head,—a wrenching or fishing shank 26 being optionally interposed between said cage or head and the box or pin 24, or its equivalent.

Instead of providing a mere lock nut at 27, relying exclusively upon the cup or cups 21 for a lifting effect (a standing valve, not shown, of any preferred design being employed at or near the bottom of the cylinder 10) I may secure to the externally threaded seat element 19, or its equivalent, an adapter carrying a hollow plunger 28 of any preferred type,—as, for example, a closely fitting metallic cylindrical plunger. Although any desired number of cups 21 may be employed, the uppermost of these plungers is preferably permitted to contact directly with a shoulder 29 at the lower edge of the cage or head 25; and the lateral openings or ports 30, shown as comprising radially disposed main oval passages 31 and minor passages 32 (the latter being back of or within cups 21) are preferably so formed and positioned that the oil or other pumped liquid, as delivered therethrough, is effective to remove and carry forward any sand or similar material which might otherwise accumulate upon or above the upper edge or surface 33 of the uppermost cup,—this edge or surface being shown as frusto-conical and as downwardly and inwardly inclined in such manner as substantially to obviate danger of any downward movement of sand or other sediment past the outer cylindrical surface 34 thereof.

In the operation of a working valve or plunger organization of the general character described (the working valve being placed either at the top or the bottom of the plunger, and a lifting gas or other fluid being optionally delivered downward through the sucker rod 12, or its equivalent as indicated by the arrow 35) the oil or other pumped fluid is forced to rise past the valve 18, or its equivalent, during each downward movement of the described connecting unit, and any desired additional valves (not shown) may be disposed laterally of or about the sucker rod 12, or its equivalent, to prevent return flow of the oil or other liquid lifted by each upward movement of the described connecting unit and associated parts,—and it will be obvious that each downward movement of said unit and associated parts, is effective to impart a relative upward movement to the pumped fluid, substantially as indicated by the arrows 36, 36$^a$ and 36$^b$.

In order to provide for a comparatively free flow, I may so proportion the lateral passages 31 and 32 relatively to main fluid passages 37 and 38 through the tubular portions of the connecting element 14 and the valve seat element 19 (these passages being preferably of substantially the same diameter) that the cross-sectional area of said lateral passages shall be at least as great as that of said main fluid passages; and I may also leave standing, between the mentioned ports or lateral passages, bridges 40 (best shown in Figs. 1 and 2) collectively at least equal, in cross-sectional area, to the cross-sectional area of the tubular stock of the body 15, at the root of the mentioned external thread thereon; and, although the outward flow of oil, or the like, delivered through the described lateral ports in cage or head 25 may be intermittent, by the downward delivery of air or a suitable light hydrocarbon through the interior of a hollow sucker rod (substantially as described in my Patent No. 1,473,967, issued November 11th, 1923, or otherwise) I may, if desired, assure not only a continuous upward delivery of oil, or the like, but a substantially continuous removal of any sand or other sediment tending to accumulate upon the uppermost cup 21, and also a light and economical operation of the entire pumping system, substantially as described in said patent. By providing, as shown, only substantially vertical and horizontal surfaces on the exterior of my units, I may moreover obviate any wedging effect and render the entire organization easily removable by an upward pull.

When the load upon the described working valve or plunger organization is comparatively light (as may result from the use of the same in a shallow well, or from a downward delivery of gas in the described manner, or from any other cause) it will be obvious that, using the described annular cups for a lifting effect, the plunger 28, may be entirely dispensed with; but it is an important merit of the described organization that, although the mentioned cups are, in any event, initially suitable for a lifting effect, they may advantageously be installed, in connection with the described cooperating parts, above a fitting and hollow cylindrical plunger, in such manner that, even after said cups become so worn as to be incapable of further use for a lifting effect, these cups may nevertheless successfully and reliably perform a wiping function,—keeping sand in circulation, and obviating such wear as would otherwise result in a downward leakage of oil, or other pumped liquid, past the plunger 28, or its equivalent; and this plunger may obviously be provided, if desired, not only with a valve near the top thereof, but with an additional valve at or near the bottom thereof,—for reasons which will be appreciated by workers in this art of pumping oils containing gas. Thus either the valve 18 (when no fitting plunger is attached therebelow) or an equivalent valve (at the bottom of plunger 28, or its equivalent, when such a plunger is employed) may, at the lower limit of downward movement, come very close to the standing valve of the described pump.

Although I have herein described a single complete embodiment of my invention, it should be understood not only that various features thereof may be independently used but also that numerous modifications might be made by those skilled in the art to which this case relates, without the slightest departure from the spirit and scope of this invention, as the same is indicated above and in the following claims.

I claim as my invention:

1. In means of the general character described, a connecting unit comprising: a tubular body having a main fluid passage and provided with means for the attachment of a blind valve cage therebelow; a series of cups on said body; a head at the upper end of said body apertured at the upper cup to provide lateral passages for the sole exit of pumped liquid for upward delivery; said upper cup having an inner surface substantially in contact with the outer surface of said body and said apertures extending below the upper edge of the said cup surface; and means, above said head for the attachment of a sucker rod thereto.

2. In means of the general character described, a connecting unit comprising: a tubular body having a main fluid passage and provided with means for the attachment of a blind valve cage therebelow; a series of cups on said body; a head at the upper end of said body apertured at the upper cup to provide lateral passages for the sole exit of pumped liquid for upward delivery; said upper cup having an inner surface substantially in contact with the outer surface of said body and said apertures extending below the upper edge of the said cup surface; and means, above said head for the attachment of a sucker rod thereto, a fishing and wrenching shank being provided above said cage.

3. In means of the general character described, a connecting unit comprising: a tubular body having a main fluid passage and provided with means for the attachment of a blind valve cage therebelow; a series of cups on said body; a head at the upper end of said body apertured at the upper cup to provide lateral passages for the sole exit of pumped liquid for upward delivery; said upper cup having an inner surface substantially in contact with the outer surface of said body and said apertures extending below the upper edge of the said cup surface; and means, above said head for the attachment of a sucker rod thereto, the cross-sectional area of the metal left standing between said apertures being at least as great as the cross sectional area of said tubular body at the root of a thread thereon.

4. In means of the general character described, a connecting unit comprising: a tubular body having a main fluid passage and provided with means for the attachment of a blind valve cage therebelow; a series of cups on said body; a head at the upper end of said body apertured coinciding with the upper edge of the upper cup to provide lateral passages for the sole exit of pumped liquid for upward delivery; said upper cup having an inner surface substantially in contact with the outer surface of said body and said apertures extending below the upper edge of the said cup surface; and means, above said head for the attachment of a sucker rod thereto, the cross-sectional area of said lateral passages being collectively at least as great as that of said main fluid passage.

5. In means of the general character described, a connecting unit comprising: a tubular body having a main fluid passage and provided with means for the attachment of a blind valve cage therebelow; a cup on said body; a head integral with said body apertured at the upper edge of said cup to provide lateral passages for the sole exit of pumped liquid for upward delivery; said upper cup having an inner surface substantially in contact with the outer surface of said body and said apertures extending below the upper edge of the said cup surface; and means, above said head for the attachment of a sucker rod thereto, said sucker rod attaching means having a longitudinal passage therethrough.

6. In means of the general character described, a connecting unit comprising: a tubular body having a main fluid passage and provided with means for the attachment of a blind valve cage therebelow; a cup in said body; a head integral with said body apertured at said cup to provide lateral passages for the sole exit of pumped liquid for upward delivery; said cup having an inner surface substantially in contact with the outer surface of said body and said apertures extending below the upper edge of said inner cup surface; and means, above said head for the attachment of a sucker rod thereto.

7. In means of the general character described, a connecting unit provided with means for securing the same to a working valve and with means for the support of wiping cups above said valve, said unit comprising a tubular body having formed thereon a ported head for discharging all the liquid therethrough, lateral ports therein being disposed opposite an edge of said cup, the inner surface of said cup being in contact with an outer surface of said body.

8. In means of the general character described, a connecting unit provided with means for securing the same to a working valve and with means for the support of wiping cups above said valve, said unit comprising a tubular body having formed thereon a head ported to discharge all the liquid therethrough, lateral ports thereof comprising main passages oval in outline and auxiliary passages substantially circular in outline, formed below said main passages; said auxiliary post being adapted to extend substantially below the upper edge of an upper wiping cup.

9. In means of the general character described: a connecting unit provided with a laterally apertured discharge head mounted integrally on a tubular body and a valve cage rigidly secured below said body, said cage being internally engaged by a threaded valve seat, and said valve seat being downwardly provided with a member serving as a lock nut and as a hollow plunger.

In testimony whereof, I have hereunto set my hand at Los Angeles, California, this 25th day of February, 1926.

FRANK I. NEVILL.